United States Patent [19]
Kornfield et al.

[11] Patent Number: 5,457,536
[45] Date of Patent: Oct. 10, 1995

[54] POLARIZATION MODULATION LASER SCANNING MICROSCOPY

[75] Inventors: Julia A. Kornfield; Vinay Gupta; Axel Kratel, all of Pasadena, Calif.

[73] Assignee: California Institute of Technology, Pasadena, Calif.

[21] Appl. No.: 222,737

[22] Filed: Apr. 4, 1994

[51] Int. Cl.$^6$ ..................................................... G01J 4/00
[52] U.S. Cl. ........................ 356/366; 356/367; 356/368; 356/370; 250/225
[58] Field of Search ........................ 356/364, 365–368, 356/370; 359/371; 250/225

[56] References Cited

U.S. PATENT DOCUMENTS

| | | | |
|---|---|---|---|
| 3,177,761 | 4/1965 | Reduer | 356/366 |
| 3,373,652 | 3/1968 | Flader | 356/366 |
| 3,495,910 | 2/1970 | Kuroha et al. | 356/366 |
| 3,612,688 | 10/1971 | Liskowitz | 356/364 |
| 4,160,237 | 7/1979 | McMahon | 356/365 |
| 4,850,710 | 7/1989 | Mochida et al. | 356/367 |
| 4,881,818 | 11/1989 | Bastamante et al. | 356/367 |
| 5,036,204 | 7/1991 | Leyden | 356/364 |
| 5,311,284 | 5/1994 | Nishino | 356/366 |
| 5,319,194 | 6/1994 | Yoshizumi et al. | 356/365 |

OTHER PUBLICATIONS

Mickols, William and Maestre, Marcos F., Scanning Differential Polarization Microscope: Its Use to Image Linear and Circular Differential Setting, Rev. Sci. Instrum. 59(6), Jun. 1988, 867–872.

Mickols et al., Imaging Differential Polarization Microscope with Electronic Readout, Rev. Sci. Instrum. 56(12), Dec. 1985, 2228–2236.

Juang et al., Design and Application of a Computer–Controlled Confocal Scanning Differential Polarization Microscope, Rev. Sci. Instrum. 59(11), Nov. 1988, 2399–2408.

Mickols et al., Visualization of Oriented Hemoglobin S in Individual Erythrocytes by Differential Extinction of Polarized Light, Proc. Natl. Acad. Sci. USA, vol. 82, pp. 6527–6531, Oct. 1985.

Beach et al., Differential Polarization Microscope Using an Image Dissector Camera and Phase–Lock Detection, Rev. Sci. Instrum. 58(11), Nov. 1987, 1987–1995.

Fuller, Optical Rheometry, 394–417.

Mickols et al., Differential Polarization Microscopy of Changes in Structure in Spermatocyte Nuclei, Nature, vol. 328, 30 Jul. 1987, pp. 452–454.

Primary Examiner—Richard A. Rosenberger
Assistant Examiner—Jason D. Eisenberg
Attorney, Agent, or Firm—Poms, Smith, Lande & Rose

[57] ABSTRACT

A polarization-modulation scanning laser microscope includes a conventional laser scanning microscope, which has been improved by addition of: a polarization state generator; a polarization state analyzer; a photo-detector for receiving laser light transmitted though a sample; a signal demodulator providing two signals in response to the transmitted laser light, one of the signals being indicative of polarization orientation, and the other signal being indicative of magnitude of the transmitted polarized light. A relay interface toggles between the two signals provided by the signal demodulator and at least one other signal provided either by the photodiode of the laser scanning microscope, or by an external optical beam induced current, or both. A signal processing unit provides an image output to a display device.

17 Claims, 17 Drawing Sheets

LINEARLY DICHROIC SAMPLE

CIRCULAR POLARIZER
-120-

FIG. 8c.

QUARTER WAVE PLATE
-116-

LINEAR POLARIZER
AT 45°
-118-

POLARIZATION MODULATION LASER SCANNING MICROSCOPY

BACKGROUND OF THE INVENTION

1. Field of the Invention

The present invention relates to methods and apparatus used in laser scanning microscopy. More particularly, the present invention relates to an improved laser scanning microscopy that can rapidly and quantitatively image the orientation distribution in the plane of an interface. Specifically, the present invention involves a novel polarization modulation laser scanning microscopy (PM-LSM) which is able to measure the magnitude and orientation of birefringence or dichroism, pixel by pixel, across a field of view, in a fraction of a second.

2. Description of Related Art

Conventional spectroscopic techniques suffer from two drawbacks: they cannot provide detailed characterization of molecular order as they require averaging over large areas of the sample, and they are unable to perform rapid and sensitive characterization for thin samples, requiring averaging for long times. In a broad class of biological or manufactured materials, direct imaging of molecular order with transmission or scanning electron microscopy (TEM or SEM), scanning tunneling microscopy (STM) and atomic force microscopy (AFM) is impossible as the very order that is being imaged can be destroyed by either irradiation damage in fragile molecular systems or by physical contact by the probe tip. Often these measurements are not meaningful due to the special constraints imposed on characterization environment when performing SEM/TEM, STM or AFM. In contrast, optical techniques serve very usefully in non-invasive and non-destructive characterization and investigation of the distortion and orientation in a sample.

Structural anisotropy of a material often results in anisotropic optical properties and consequently, measurement of these properties provides a means to characterize molecular order. Images of optical anisotropy of oriented materials have been used to investigate a wide range of phenomena, including the development of cell structure, the phase transitions of liquid crystals, and the stress distribution in solids under load. One way to measure optical anisotropy is by changes in polarization of light during transmission through a material. The polarization of light is affected by the material's refractive index tensor ($n_{ij}=n'_{ij}+i\ n''_{ij}$) in two ways, it may be altered by anisotropic attenuation (dichroism, $\Delta n''$) and/or by the anisotropic retardation (birefringence, $\Delta n'$). The magnitude and orientation of these quantities can be related to the orientational correlation that exists in the material, in particular, the degree of order (for example, the scalar order parameter S in a uniaxial nematic liquid crystal) and the orientation of the optical axis (for example, the director in a uniaxial nematic). Thus it becomes possible to quantify the orientation field in the sample by the pattern of birefringence or dichroism that is observed. Conventional methods of polarization imaging involve using optical microscopy with the sample between crossed polarizers, and thus these conventional methods provide only qualitative information. Moreover, the use of a broad-band light source tends to blur the image. This blurring is usually worsened by the relatively poor extinction ratios of the film polarizers that have been used. Even if a monochromatic source and ideal polarizers were used in these conventional methods, the magnitude and orientation of birefringence or dichroism cannot be determined from the measured intensity image alone.

Polarimetry allows quantitative measurement of dichroism and birefringence. A typical polarimetric arrangement is shown in FIG. 6. An effective method to measure these optical anisotropies is based on modulation of the polarization of light. High sensitivity and rapid dynamic response is achieved by introducing a carrier frequency at which the light beam is modulated. Synchronous demodulation techniques using lock-in amplifiers isolate specific fourier components of the transmitted light intensities that are utilized to quantify the sample's anisotropy. As a result of polarization modulation, the need for rotating the polarizers or the sample is obviated. However, as the polarimetric technique provides information that is spatially averaged over the spot of incidence of light, it is desirable to enhance the capability of the polarimetric technique to characterize the spatial variation of dichroism and birefringence. This can be achieved by integration of polarimetry with optical scanning microscopy.

A fundamental feature of optical microscopy is that the object to be imaged is illuminated as a whole by a condenser and imaged onto an intermediate image plane by the objective. This intermediate image plane is viewed with an eyepiece as in conventional microscopy or can be scanned with the electron beam of a camera tube in TV microscopy. The field of the image plane can be restricted to a smaller area and the intensity detected using photo-multipliers or photo-diodes. In contrast, in scanning microscopy the object is not illuminated as a whole but is illuminated point by point, and the reflected or transmitted or scattered light is measured using photo-detectors. These point measurements are transformed into brightness values that can be viewed on a conventional video monitor. This method possesses considerable advantages over conventional light microscopy as it allows electronic enhancement of the contrast and the brightness of the image. Coupled with elimination of stray light background due to interfering light, scanning microscopy results in a much superior image.

Several additional features can enhance the performance of scanning microscopy. In laser scanning microscopy, a laser light source provides highly collimated, coherent, and monochromatic light that can be focussed at a small area with a high intensity. Due to a high speed of scanning, the residence time of the high intensity beam at each point is very small and no degradation of the sample occurs. Scanning of the image field is achieved either by beam scanning or via mechanical movement of the sample for a static beam. Beam scanning can be accomplished by several means, for example, using acousto-optical deflectors, or resonant or servo-controlled galvanometer systems or using a scanning optical probe. FIG. 7b shows the basic set-up of an optical scanning microscope.

The features of scanning microscopy and polarimetry have been recently combined in differential polarization imaging. Two prototype differential polarization microscopes have been constructed that incorporate necessary polarizing optics, in particular the polarization state generating (PSG) unit and the polarization state analyzing (PSA) unit, along with the demodulating electronics. Both prototypes use nearly collimated, monochromatic ultraviolet (UV) light. In one prototype, full field illumination and a diode camera are used, and in the other, the sample is moved in a raster fashion with respect to a stationary spot of light. Image acquisition is done at two different sample orientations to determine both the magnitude and orientation of dichroism or birefringence.

The basic principle behind these microscopes can be extended to provide simultaneous determination of both the magnitude and the orientation angle of dichroism and birefringence. Further improvement can be achieved by use of a collimated, highly coherent and monochromatic laser light and rastering the laser light across the sample, thereby increasing the sensitivity and speed of the measurement. Accordingly, a principal object of the present invention is to provide a method to enable rapid and sensitive measurement of both the magnitude and orientation of the birefringence or dichroism by combining the benefits of both polarimetry and laser scanning microscopy in a single system.

SUMMARY OF THE INVENTION

The present invention includes improvements to an existing laser scanning microscope (LSM), such as the Zeiss LSM, to produce a device which will enable measurement of the magnitude and orientation of the birefringence or dichroism pixel by pixel, across the field of view, in a fraction of a second. As shown in FIGS. 7a and 7b, the Zeiss LSM (or another LSM) focuses a polarized laser beam to a diffraction-limited spot. In the Zeiss LSM the laser beam is rastered across the image field very rapidly using a servo-controlled, feedback galvanometer system. A dual laser option provides laser light at wavelengths of 514 nm and 488 nm for an Argon-ion laser and at 543 nm for a green Helium-Neon laser. The Zeiss LSM permits simultaneous display of images constructed from two independently acquired signals from the same scanned area. FIGS. 7a and 7b show the basic optical and electronic scheme of an instrument such as the Zeiss LSM.

The polarization modulation laser scanning microscopy (PM-LSM) technique of the present invention includes a standard laser scanning microscope (LSM), such as the Zeiss LSM, which is modified by the addition of a polarization state generation unit (PSG), a polarization state analyzing unit, a photo-detector, and a signal demodulation unit. A relay interface to toggle between signals may also be included to allow additional external signals, as well as signals from the signal demodulation unit, to be input to a signal processor. As the laser beam rasters across the sample, image signals from each pixel are recorded in an image file. Using the information obtained from these two signals, the PM-LSM creates an image with two parts: one that is a function of the orientation (proportional to the orientation of the optical axis in the sample) and a second that is a function of the magnitude (proportional to the degree of order in the sample) of dichroism or birefringence.

In accordance with the present invention, an improved LSM is provided which may include: a polarization state generation unit (PSG) for preparing said light to have a polarization state that is modulated at with a frequency f; a polarization state analyzing unit to selectively analyze the linear and circular components of polarized light; a signal detection unit for converting light intensity to an oscillating signal; and a signal demodulation unit for isolating the amplitude and/or phase of specific harmonic(s) of the oscillating signal from the signal detection unit.

An improved LSM may also include a relay interface for switching between conventional and polarization modulation microscopy. This design provides the ability to change between operation in a conventional laser scanning mode and the new polarization modulation laser scanning mode.

The present invention provides numerous advantages over prior LSM's. Rapid (for example, over 2000 pixels per second) and sensitive imaging by polarization-modulation laser-scanning microscopy (PM-LSM) provide a means to study orientational order in a wide class of oriented materials and allows observation of reorientational dynamics. The present invention also makes it possible to enhance fundamental understanding of a number of phenomena such as: orientation in thin films routinely used to align liquid crystals in display technology and the efficacy of the alignment process; dynamics of defect creation and annihilation in condensed matter; and factors affecting molecular order in ultra-thin Langmuir-Blodgett films.

The present invention may further include a method of PM-LSM comprised of the following steps: emitting laser light; preparing the emitted laser light to have a polarization state modulated at a frequency f; focussing the prepared laser light on a sample laying upon an image plane; collecting the condensed laser light emitted through said image plane, the collected laser light having linearly and circularly polarized components; selectively isolating a light intensity of the linearly and circularly polarized components of said collected laser light; converting the light intensity to an oscillating analog signal; and outputting at least one specific harmonic of the oscillating analog signal. The method may also include a step which allows the laser light to raster across the sample either by rastering the emitted laser light or by rastering the image plane with respect to a stationary spot of laser light.

Other objects, features and advantages of the present invention will become apparent from a consideration of the following detailed description, and from the accompanying drawings.

BRIEF DESCRIPTION OF THE DRAWINGS

FIG. 8a is a basic schematic of a polarization state analyzing unit which is empty;

FIG. 8b is a basic schematic of a polarization state analyzing unit which includes a circular polarizer;

FIG. 8c is a basic schematic of a polarization state analyzing unit which includes a quarter wave plate and a linear polarizer.

DETAILED DESCRIPTION OF THE PREFERRED EMBODIMENTS

Figure 1:
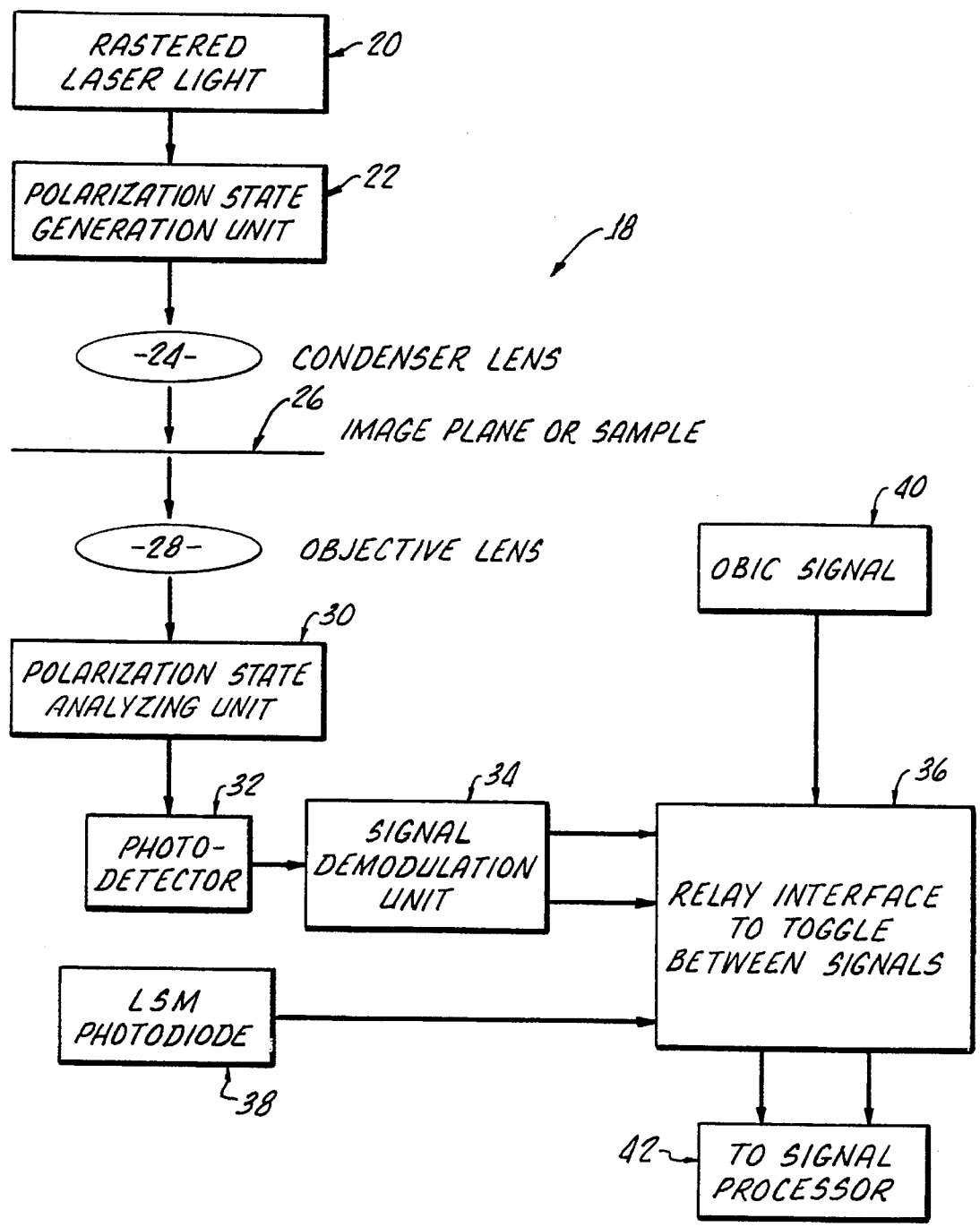
FIG. 1 is a schematic of the modifications to a laser scanning microscope (LSM) in accordance with the present prototype for performing polarization modulation laser scanning microscopy.

Referring more particularly to the drawings, FIG. 1 is a depiction of a schematic of improvements to a standard laser scanning microscope (LSM), such as the Zeiss LSM, for performing polarization modulation laser scanning microscopy (PM-LSM). A polarization modulation laser scanning microscope 18, as shown in FIG. 1, may include the following basic components: a rastered laser light 20; a polarization state generation unit (PSG) 22; a condenser lens 24; an image plane for a sample 26; an objective lens 28; a polarization state analyzing unit (PSA) 30; a photo-detector or signal detection unit 32; a signal demodulation unit 34; a relay interface unit to toggle between conventional and polarization modulation microscopy signals 36; and a signal processing unit 42.

In FIG. 1, the blackened boxes (22, 30, 32, 34, and 36) are the improvements in accordance with the present invention which are added to a standard LSM to perform polarization-modulation laser scanning microscopy. The improvements may be divided into two major categories, optical and electronic. The optical improvements, include a PSG 22 which has been fabricated and may contain three types of components (linear polarizer 160, photo-elastic modulator 162, and quarter wave plate, seen in FIGS. 4 and 5, inclusive 164). The PSG 22 may be fabricated into a single unit that is easily inserted into and removed from the optical train. For example, in the current prototype the PSG 22 has been matched with an existing reflector slider (not shown) on the Zeiss LSM located between the rastering elements that scan the laser light source and the condenser lens 24 as shown in FIG. 1. Similarly, the analyzer component PSA 30 (a circular polarizer, 120 as shown in FIG. 8b, for birefringence images, see FIGS. 4b, 5b, 5d, 5f, and 5h) goes beneath the sample stage 26 in the microscope.

Figure 4A:
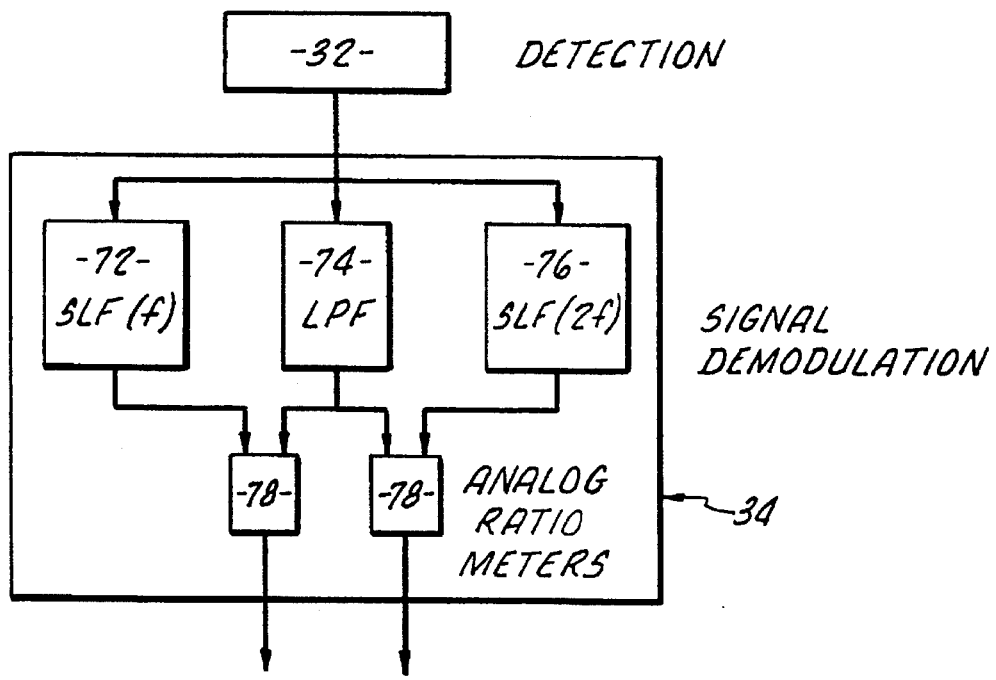
FIGS. 4a-b are schematics of the optical trains and the signal demodulation unit for a preferred combination, for specific linearly dichroic and linearly birefringent samples.

The objective of the electronic improvements shown in FIG. 1 is to record the demodulated signals that contain the intensity signal ratios needed to measure birefringence or dichroism. The Zeiss LSM has been equipped with an external silicon photo-diode 64 (FIG. 2) that intercepts the laser beam (or the light collected by the objective lens 28) before it reaches the internal photo-diode 38 of the LSM (FIG. 1). The signal from the detector 32 is demodulated by the lock-in amplifiers (72 and 76, as shown in FIG. 4a). The outputs from the lock-in amplifiers (72 and 76) are normalized by the mean intensity ($I_{dc}$) provided by a low-pass filter 74 and then fed to the signal processing unit 42 of the LSM via a relay interface 36 that toggles between the two PM-LSM signals (from signal demodulation unit 34) and additional external microscopy signals (shown in FIG. 1 as LSM photo-diode and OBIC signal 40 and in FIG. 9 as external signals 54 and 56).

Figure 4B:
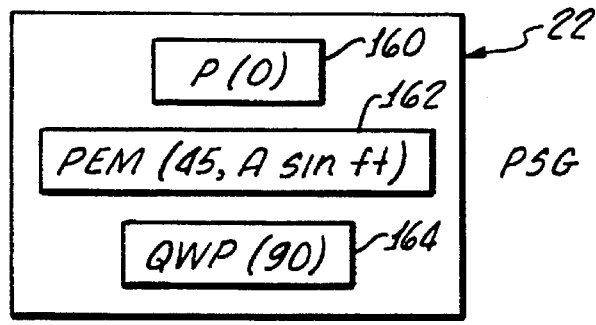
Figure 9:
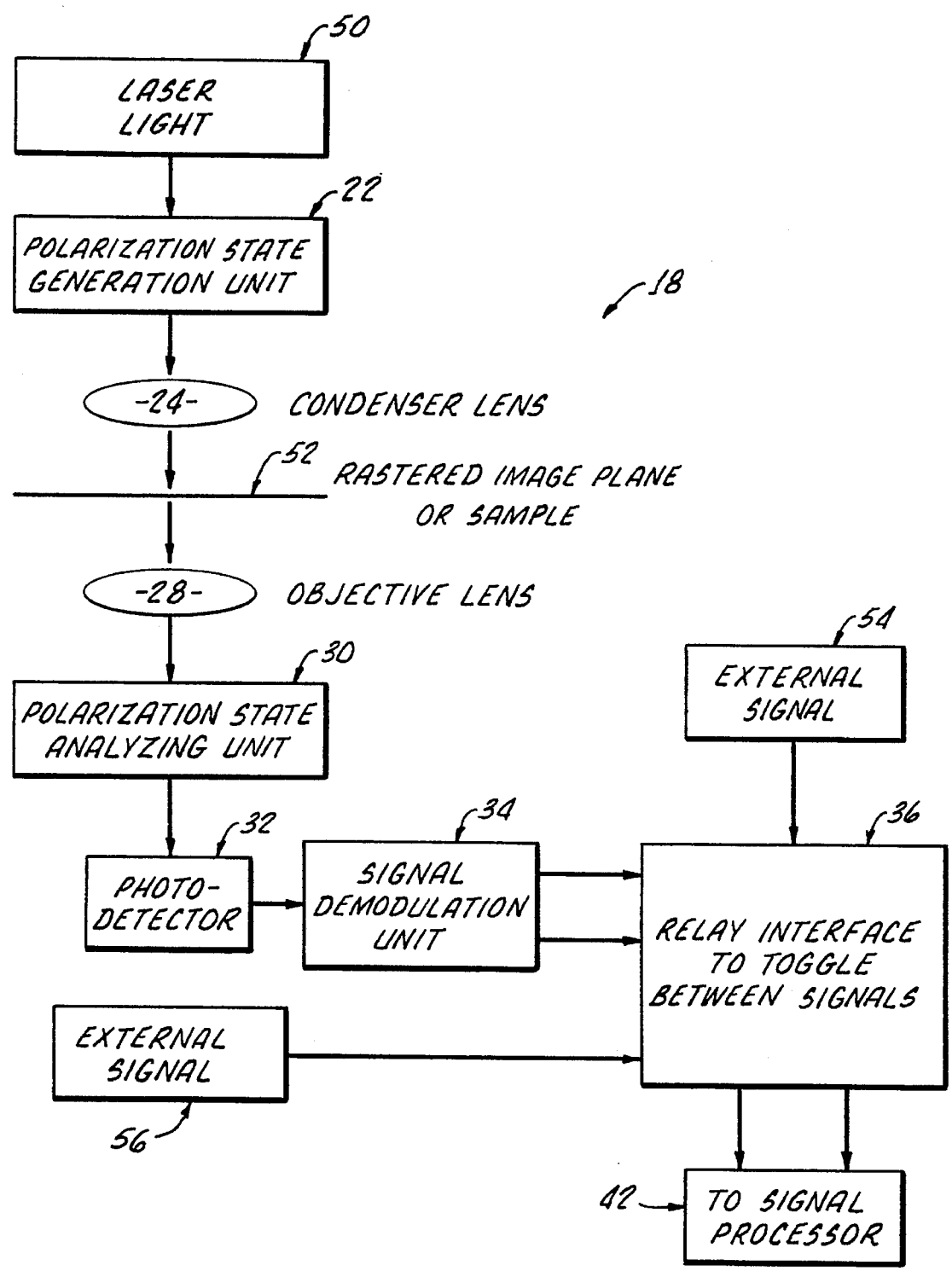
FIG. 9 is a schematic of the modifications to a laser scanning microscope (LSM) having a rastered image plane or sample.

A laser light source 20 provides a highly collimated, coherent, and monochromatic light beam that can be focussed at a small area with a high intensity. The laser light source 20 is rastered in a predetermined pattern. (A stationery laser light 50 may be used in conjunction with a rastered image plane or sample 52 as shown in FIG. 9.) The PSG 22 (detailed in FIGS. 4a–b) modulates the polarization state of the laser light so that it sweeps back and forth through an angle. The PSG 22 in FIG. 4a–b is a preferred combination of a schematic arrangement for a PSG 22 for determination of linear dichroism or linear birefringence. It includes a linear polarizer 160, a photoelastic modulator 162 at an angle of 45° with respect to the linear polarizer, and a quarter wave plate 164 at a 90° angle with respect to the linear polarizer 160. This combination can be used for simultaneous determination of both the magnitude and angle of orientation of the anisotropy (dichroism or birefringence).

The polarization modulating unit 22, in the current prototype consists of a linear polarizer 160 from Melles Griot, a Hinds International photoelastic modulator 162 (PEM) oriented at 45° with respect to the polarizer 160 and a quarter-wave retarder 164 from Melles Griot oriented at 90° with respect to the polarizer 160. In this prototype the frequency of the modulator 162 is f=63 kHz and the amplitude ($\delta_o$) of its sinusoidal retardation is set such that $J_o(\delta_o)=0$ to simplify the signal analysis.

Transmission through the PSG 22 in FIG. 4a–b produces a linearly polarized beam of constant intensity and an orientation that sweeps back and forth through a wide angle with a frequency f. As the polarization direction of the beam sweeps back and forth it probes the orientation dependence of the properties of the sample 26. If the material is dichroic, then the attenuation of the beam rises and falls as its orientation sweeps back and forth. For the case of a sample that is birefringent with little or no dichroism, only the phase of the transmitted beam is anisotropically affected by the sample. That is, as the orientation of the incoming polarization swings back and forth, the degree of ellipticity of polarization state of the emerging beam rises and falls. This modulation of the ellipticity of the polarization state may be translated into a measurable intensity variation using a circular polarizer as the PSA 30 (discussed below).

The condenser lens 24 focuses the light from the PSG 22 onto the image plane of the sample 26. Objective lens 28 collects the light from the image plane 26 and sends it through a polarization state analyzing unit (PSA) 30. As shown in FIG. 8b, when measuring birefringence, the PSA 30 may include a circular polarizer 120. Alternatively, when measuring birefringence, the PSA 30 may include an equivalent combination of quarter wave plate 116 and linear polarizer 118 oriented such that their mutual angle is 45°. The PSA 30 may be empty (122 as shown in FIG. 8a) when measuring dichroism. FIGS. 4a–4b and 5a–5h show specific examples.

Figure 2:
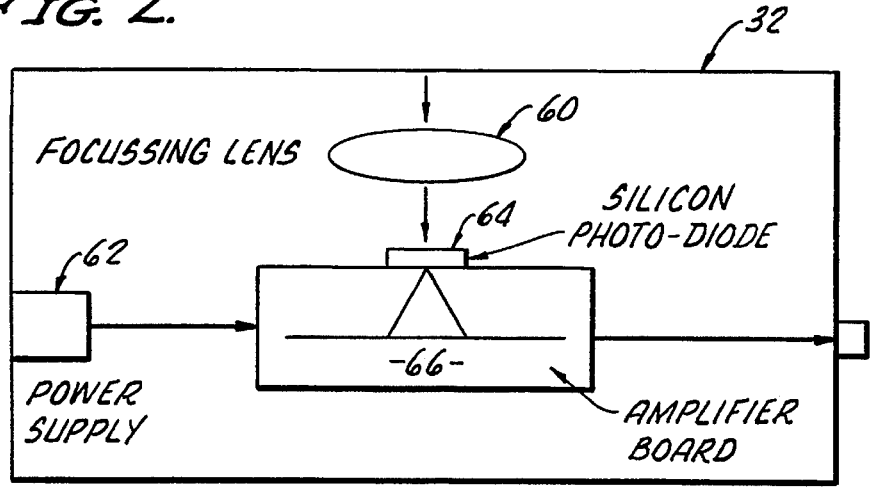
FIG. 2 is a schematic arrangement for the signal detection unit in the current prototype for polarization modulation laser scanning microscopy.

Information from PSA 30 is then sent through a photo-detector or signal detection unit 32, a signal demodulation unit 34 and a relay interface 36 to toggle between signals or unit for switching between conventional and polarization modulation microscopy. FIG. 2 shows a preferred schematic arrangement for the signal detection unit or photo-detector 32. The photo-detector 32 sends the light transmitted through the PSA 30 via a focussing lens 60 to a silicon photo-diode 64 which lies on amplifier board 66 (powered by power supply 62). The silicon photo-diode 64 intercepts the laser beam before it reaches the internal photo-diode 38 of the LSM (see FIG. 1). If the beam field is sufficiently narrow (as when using high magnification) so as to fall completely on the photo-diode, the focussing lens 60 may not be used. In one preferred embodiment, the externally provided silicon (Si) photo-diode 64 is a Universal Detector, 6pinDP, where the light intensity is converted to an analog voltage signal.

Unit 34 in FIG. 4a–b shows a schematic of the preferred arrangement for the signal demodulation which includes a lock-in amplifier 72 for the first harmonic (f), a lock-in amplifier 76 for the second harmonic (2f), a low-pass filter 74, and two analog ratio circuits 78. One analog ratio circuit 78 preferably receives signals from lock-in amplifier 72 and low-pass filter 74. The second analog ratio circuit 78 preferably receives signals from lock-in amplifier 76 and low-pass filter 74. The signal from the detector 32 is demodulated by the lock-in amplifiers 72 and 76. The outputs from the lock-in amplifiers (72 and 76) are normalized by the mean intensity ($I_{dc}$) provided by the low-pass filter 74. Low-pass filter 74 is shown as LPF. The lock-in amplifier 72 for the first harmonic (f) is shown as SLF(f) and is a single phase lock-in amplifier that provides input signal amplitude. The lock-in amplifier 76 for the second harmonic (2f) is shown as SLF(2f) and is also a single phase lock-in amplifier that provides input signal amplitude. Digital ratio meters with a high speed of operation may also be used.

In one preferred embodiment of the signal demodulation unit 34, the LPF 74 is a Stanford Research SR-640 low-pass filter. Synchronous demodulation is performed using two lock-ins: a Stanford Research SRS-850 digital lock-in amplifier and an Ithaco 3962A lock-in amplifier. The laser scanning rate is limited by the requirement that the dwell time per pixel be sufficiently large for the lock-ins to perform demodulation. This can be achieved by keeping the dwell time per pixel about five times the time constant of the low pass filter circuit in the lock-in. The minimum time constant of the lock-in amplifiers are 10 μs for the SRS-850 and 100 μs for the Ithaco 3962A.

Figure 3:
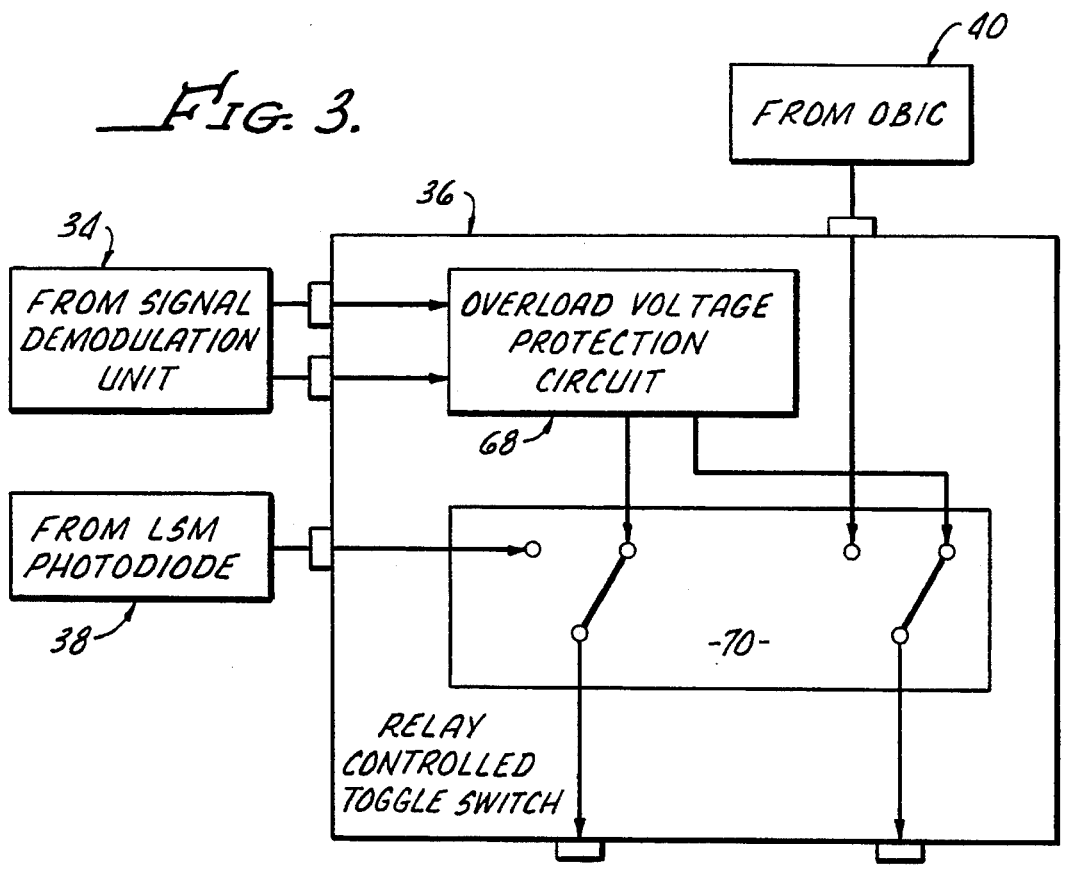
FIG. 3 is a schematic arrangement for the switching unit to toggle between conventional laser scanning microscopy and polarization-modulation laser scanning microscopy in the current prototype.

FIG. 3 is a schematic of the preferred arrangement of the relay interface 36 for the switching unit to toggle between conventional laser scanning microscopy and polarization-modulation laser-scanning microscopy. Since two signals are sent from the signal demodulation unit 34 in FIGS. 4a–b, the relay interface 36 toggles between the channel for the signal from the LSM photo-diode 38 and the channel for the OBIC signal (optical beam induced current) 40 and the two signals from the signal demodulation unit 34. The output signals from the relay interface 36 are directed to a signal processing unit 42 (FIG. 1) of the LSM. Conventional laser scanning microscopy, (which may be, for example, transmission microscopy, reflectance microscopy, or fluorescence microscopy) and PM-LSM can be done on the same apparatus.

In a preferred embodiment using Zeiss LSM, the two signals are recorded in an image file. Calibration is performed using a linear polarizer. For an unknown sample, the signals for each pixel in the image files are converted to magnitude and orientation of dichroism or birefringence for that pixel using mathematical relations obtained by an analysis of the optical arrangement. Using these, the whole image is reconstructed, pixel by pixel, for both magnitude and orientation images.

A photoelastic modulator 162 is limited to sinusoidal variation of its retardation, and as a consequence the modulation of light transmitted contains infinitely many harmonics of the fundamental frequency (f), each weighted by a Bessel function of the first kind ($J_o, J_1, J_2$ etc.) evaluated at the amplitude ($\delta_o$) of the PEM. The PEM 162 may be replaced by an electrooptic modulator (EOM) which provides sinusoidal modulation at higher frequencies than that achieved with PEMs. Simplification in the modulation and demodulation can be achieved with an EOM by using a saw-tooth modulation of retardation. In such an arrangement the demodulation comprises of extracting the amplitude and phase of the oscillating signal input from the detection unit 32. This can be accomplished by using either one dual-phase lock-in-amplifier or two single phase lock-in-amplifiers.

Figure 5A:
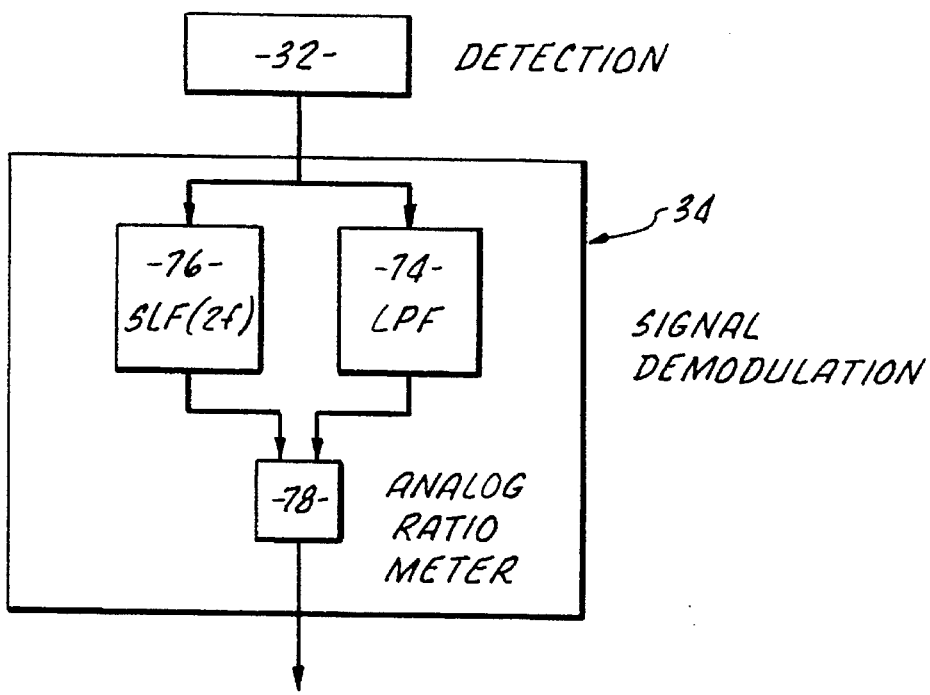
FIGS. 5a-h are schematics of alternative optical trains and the signal demodulation unit for specific linearly dichroic and linearly birefringent samples.

Polarization-modulation laser-scanning microscopy may be performed with a variety of different arrangements for the optical and electronic components. FIGS. 5a–h show that the PSG 22 may comprise of various combinations of a linear polarizer 160 (P), a quarter wave plate 164 (QWP), a half wave plate 166 (HWP), and a photoelastic modulator 162 (PEM). The orientation angle of the optical elements is specified in parentheses in the schematic representations. These possible arrangements in combination with other elements of the optical train are shown in FIG. 5a–h. FIG. 5a maybe used for determination of either the magnitude for a known orientation or the orientation for a known magnitude, of linear dichroism. The PSG 22 in FIGS. 5b–h may be used for simultaneous determination of both degree and angle of orientation of dichroism or birefringence. The rotating wave plate scheme produces a simpler modulation than that using a PEM as shown in FIG. 4a–b, but is limited to frequencies of a few kHz. As stated earlier, an EOM may be used to replace the PEM to achieve simplification in modulation and higher frequencies. Also as in the preferred combination in FIGS. 4a–b and 8b, the PSA 30 may include a circular polarizer 120 (or a combination of quarter wave plate 116 and linear polarizer 118 oriented such that their mutual angle is 45°, as shown in FIG. 8c, may be substituted for the circular polarizer 120) when measuring birefringence, and is empty 122 (see FIG. 8a) when measuring dichroism.

Figure 5B:
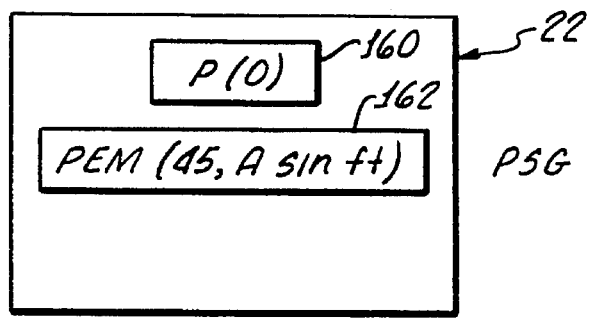
Figure 5C:
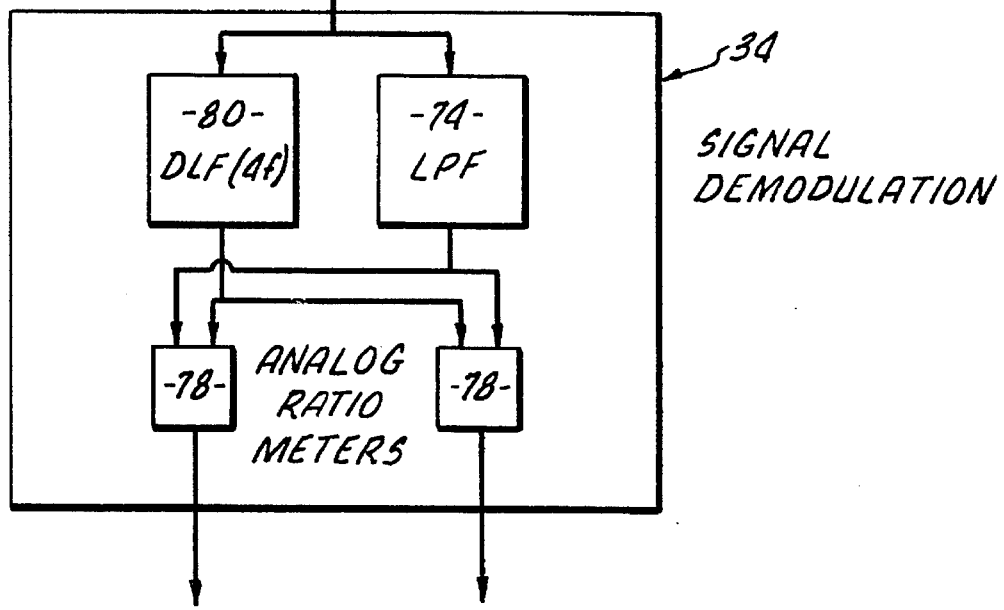
Figure 5D:
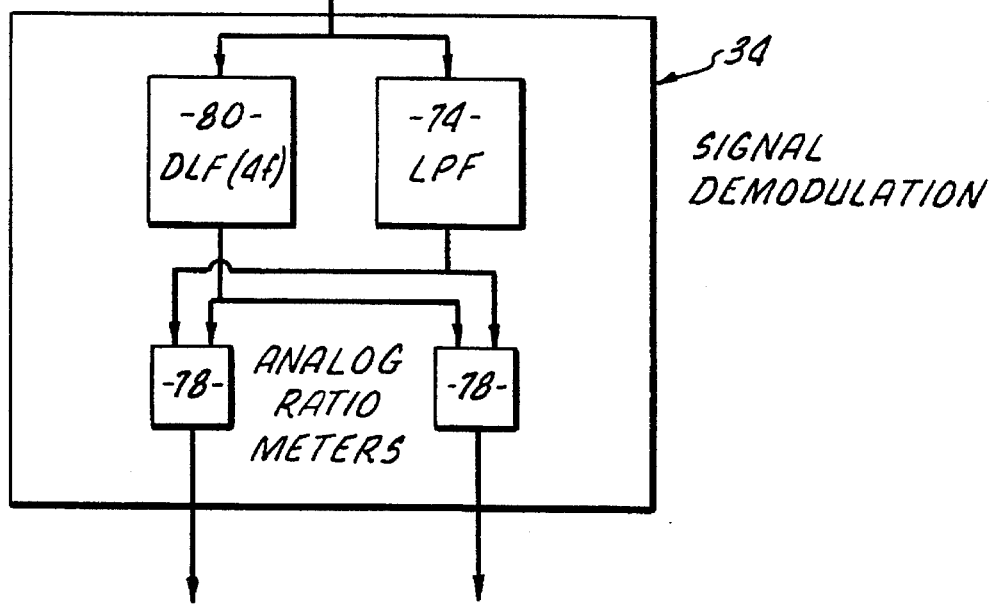
Figure 5E:
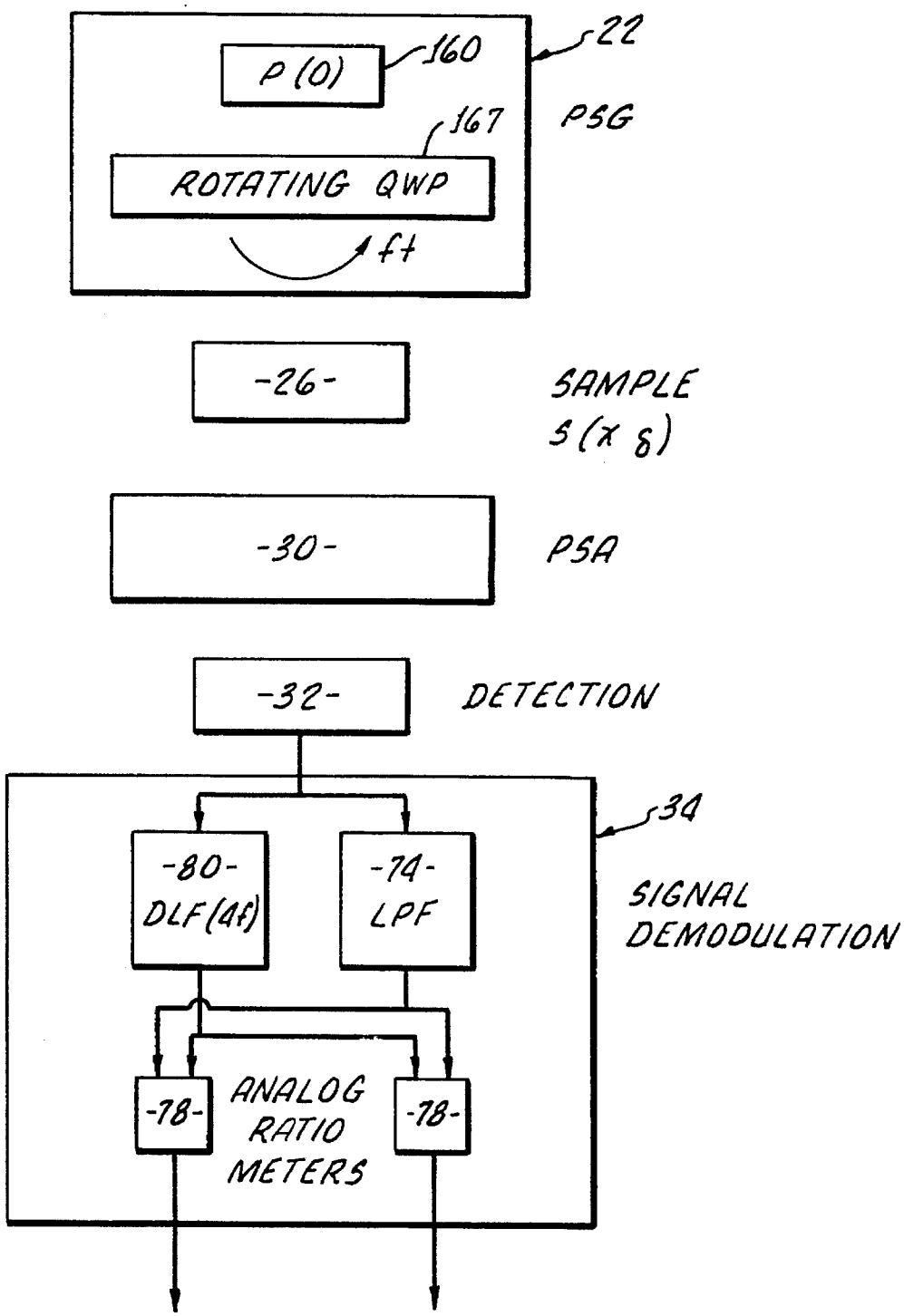
Figure 5F:
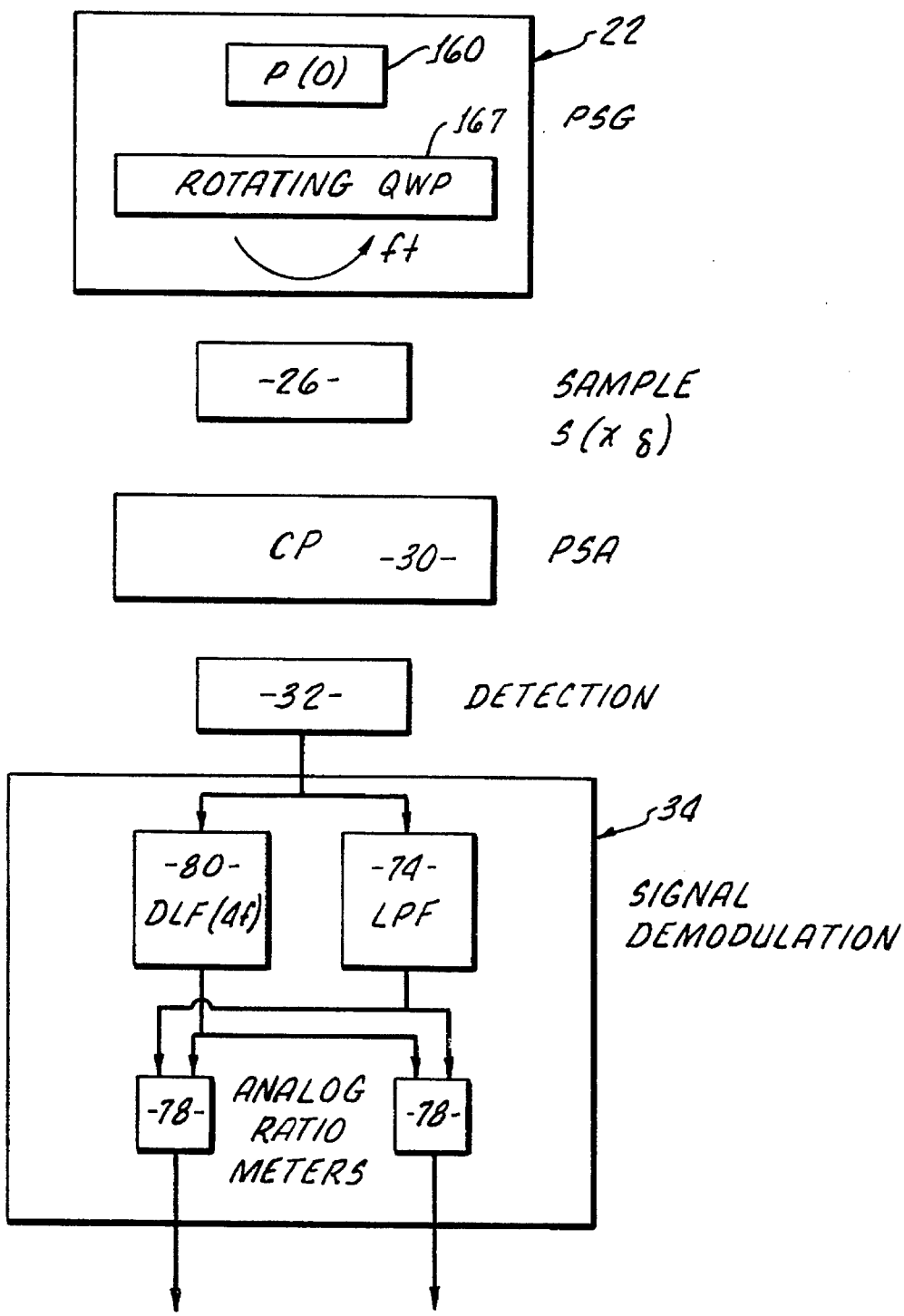
Figure 5G:
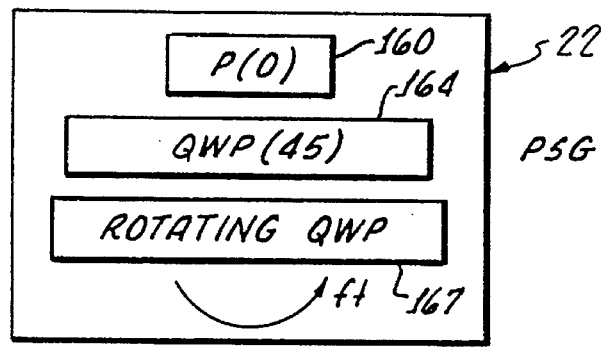
Figure 5H:
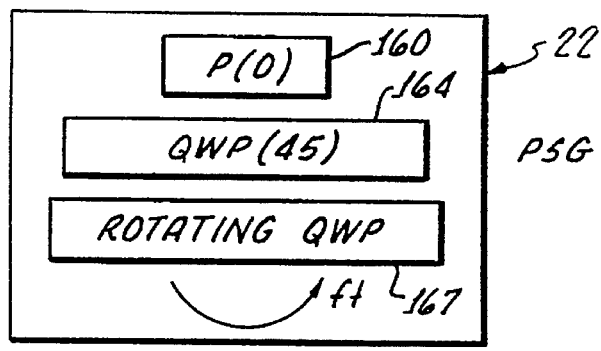
Figure 6:
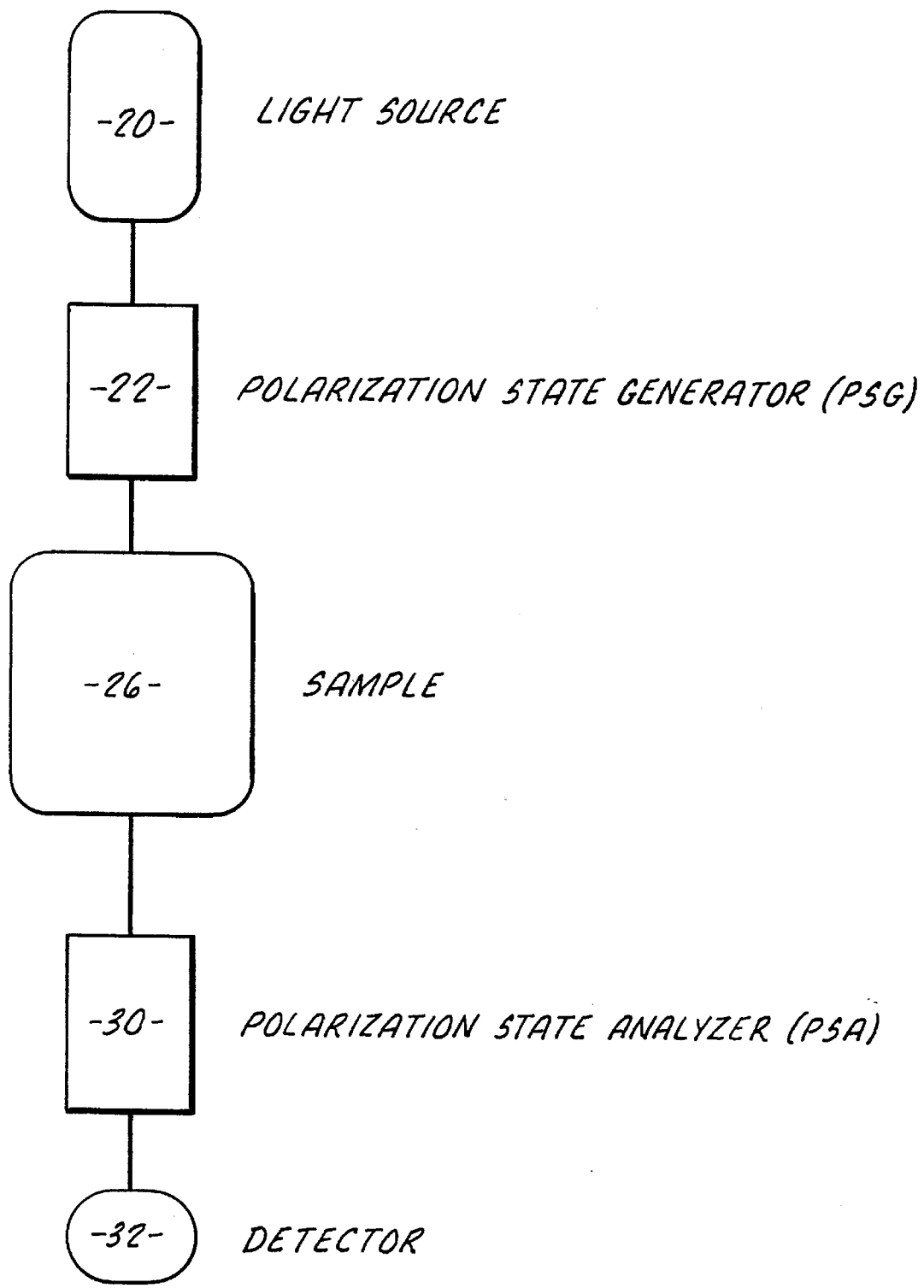
FIG. 6 is a basic schematic of a polarimetric arrangement.
Figure 7A:
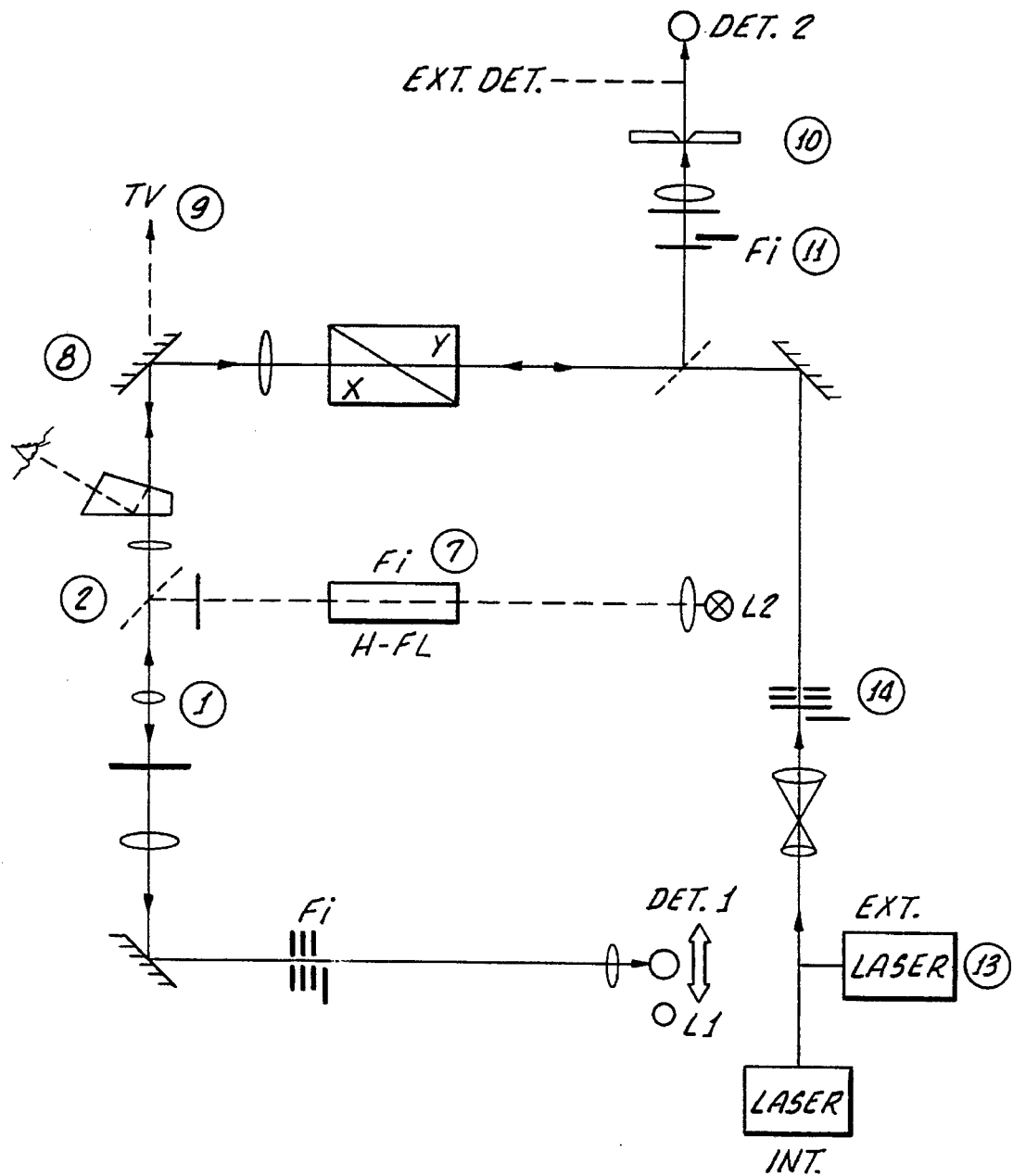
FIG. 7a is a basic schematic of the optical beam path in the Zeiss LSM.
Figure 7B:
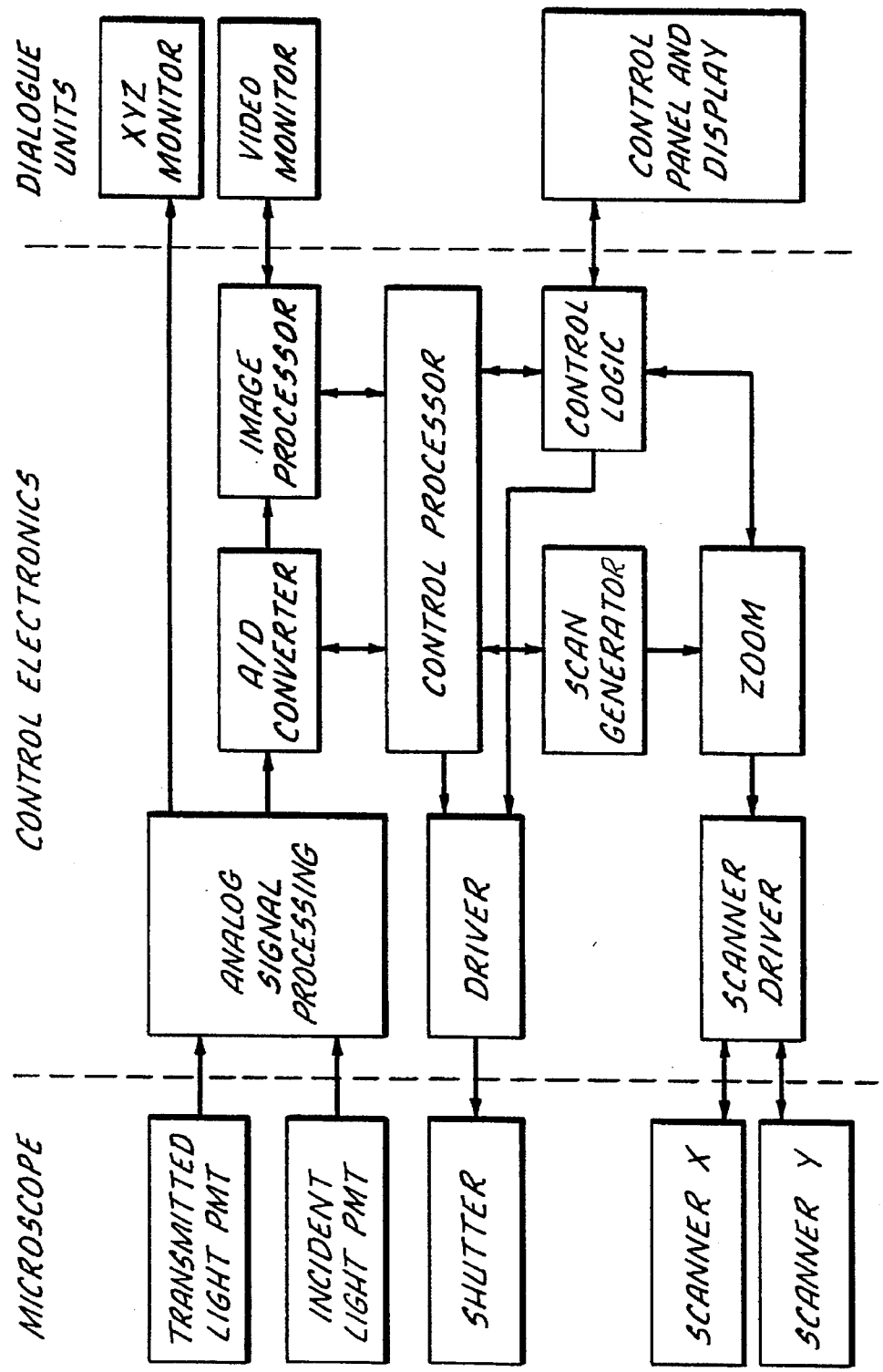
FIG. 7b is a basic schematic of the electronic scheme of the Zeiss LSM.

The signal demodulation unit 34 in FIG. 5a uses only one lock-in-amplifier 76 as the optical arrangement can only be used to measure either the magnitude or orientation of dichroism. Consequently, the relay interface 36 for this arrangement need only toggle between two signals and not two pairs of signals. The signal demodulation for FIG. 5b is same as that for preferred combination shown in FIGS. 4a–b. The signal demodulation units 34 in FIGS. 5c–f use one dual phase lock-in-amplifier 80, one low pass filter 74, and two analog ratio meters 78. The dual phase lock-in-amplifier demodulates the input signal from the detector and outputs the in-phase and out-of-phase components of input signal. One analog ratio circuit preferably receives the in-phase output from lock-in amplifier 80 and normalizes it with the low-pass filter 74 output. The second analog ratio circuit preferably receives the out-of-phase output from lock-in amplifier 80 and normalizes it with the low-pass filter 74 output. The lock-in amplifier 80 for the fourth harmonic (4f) is shown as DLF(4f). Two single phase lock-in-amplifiers can be used instead of one dual phase lock-in-amplifier. The signal demodulation in FIGS. 5g–h is similar as that in FIGS. 5c–f, except that the lock-in-amplifier 82 extracts the second harmonic (2f).

Additionally, an alternative combination could use the conventional LSM photo-diode in place of the preferred arrangement of the signal detection unit 32. With this alternative combination, the signal from the LSM photo-diode would be routed through the signal demodulation unit when polarization-modulation laser-scanning microscopy was performed. If this alternative combination was used, the signal demodulation unit could be housed internally in the LSM. The signal demodulation unit 34 may use any alternative combination of single or dual phase detection circuits to isolate the harmonic of interest.

It will be understood by those skilled in the art that the present invention is not to be limited to the precise embodiments as described hereinabove and as shown in the accompanying drawings. For example, any standard LSM may be used as a base for the above discussed improvements or PM-LSM may be performed by combining appropriate equivalent parts and the PM-LSM may be adapted for samples not discussed herein. Accordingly, the present invention is not limited to the arrangements precisely as shown and described hereinabove.

What is claimed is:

1. A polarization modulation laser scanning microscope comprising:

a laser light source for emitting laser light;

a polarization state generation unit (PSG) receiving the emitted laser light to provide prepared laser light having a linear polarization state a polarization direction of which is modulated at a frequency f;

a first lens for focussing the prepared laser light on a sample laying upon an image plane;

a second lens for collecting focused laser light transmitted through said image plane, the collected laser light having linearly and circularly polarized components;

a polarization state analyzer unit (PSA) for selectively isolating linearly and circularly polarized components of said collected laser light;

a signal detection unit for converting intensity of said linearly and circularly polarized components of said collected light to an oscillating analog signal;

a signal demodulation unit having outputs including at least one specific harmonic of the oscillating analog signal;

further comprising additional external microscopy means, said additional external microscopy means having outputs; and a relay interface having means for toggling between said outputs from said signal demodulation unit and said outputs from said additional external microscopy means.

2. A microscope as defined in claim 1 wherein said PSG is comprised of a linear polarizer and a modulator.

3. A microscope as defined in claim 2 wherein said modulator is at a 45° angle with respect to the linear polarizer.

4. A microscope as defined in claim 2 wherein said modulator includes a photoelastic modulator.

5. A microscope as defined in claim 2 wherein said modulator includes an electrooptic modulator.

6. A microscope as defined in claim 2 wherein said PSG further includes a quarter wave plate, wherein said quarter wave plate is at a 45° angle with respect to the modulator.

7. A microscope as defined in claim 1 wherein said PSG is comprised of a linear polarizer and a rotating wave plate.

8. A microscope as defined in claim 7 wherein said rotating wave plate includes a rotating half-wave plate.

9. A microscope as defined in claim 7 wherein said rotating wave plate includes a rotating quarter-wave plate.

10. A microscope as defined in claim 7 wherein said PSG further includes a quarter wave plate inserted between the linear polarizer and the rotating wave plate, wherein said quarter wave plate is at a 45° angle with respect to the linear polarizer.

11. A microscope as defined in claim 1 wherein said PSA is empty.

12. A microscope as defined in claim 1 wherein said PSA includes a circular polarizer.

13. A microscope as defined in claim 1 wherein said PSA includes a quarter wave plate and a linear polarizer with a mutual angle of 45°.

14. A microscope as defined in claim 1, wherein said signal demodulation unit further comprises:

at least one single phase lock-in amplifier;

a low-pass filter; and at least one ratio meter;

wherein said at least one ratio meter receives a signal from said at least one single lock-in amplifier and low-pass filter.

15. A microscope as defined in claim 1, wherein said signal demodulation unit further comprises:

at least one dual phase lock-in amplifier;

a low-pass filter; and at least one ratio meter;

wherein said at least one ratio meter receives a signal from said at least one dual lock-in amplifier and low-pass filter.

16. A microscope as defined in claim 1 wherein said signal demodulation unit provides input to a signal processing unit.

17. A microscope as defined in claim 16 wherein said signal demodulation unit provides input to said relay interface which provides input to said signal processing unit.

* * * * *